: US 8,803,480 B2
(45) Date of Patent: Aug. 12, 2014

(54) CHARGE/DISCHARGE CONTROL APPARATUS AND CHARGE/DISCHARGE CONTROL METHOD

(75) Inventors: Kazuhiro Muto, Chiba (JP); Hideaki Matsui, Chiba (JP); Hiroaki Murase, Tokyo (JP)

(73) Assignees: The Japan Research Institute, Limited, Tokyo (JP); ITOCHU Corporation, Osaka (JP)

( * ) Notice: Subject to any disclaimer, the term of this patent is extended or adjusted under 35 U.S.C. 154(b) by 551 days.

(21) Appl. No.: 13/239,402

(22) Filed: Sep. 22, 2011

(65) Prior Publication Data

US 2012/0007563 A1    Jan. 12, 2012

Related U.S. Application Data

(63) Continuation of application No. PCT/JP2010/002148, filed on Mar. 25, 2010.

(30) Foreign Application Priority Data

Mar. 27, 2009    (JP) ................. 2009-080597

(51) Int. Cl.
    *H02J 7/00*    (2006.01)
    *B60L 11/18*   (2006.01)
    *H02J 3/32*    (2006.01)
    *H01M 10/44*   (2006.01)
    *H02J 3/00*    (2006.01)

(52) U.S. Cl.
    CPC ............... *H02J 3/32* (2013.01); *B60L 11/1842* (2013.01); *Y02T 90/14* (2013.01); *Y02E 60/721* (2013.01); *B60L 11/1844* (2013.01); *Y02T 90/128* (2013.01); *H01M 10/44* (2013.01); *Y04S 10/126* (2013.01); *Y02E 70/30* (2013.01); *Y04S 10/54* (2013.01); *Y02T 10/7005* (2013.01); *Y02T 10/7088* (2013.01); *B60L 2230/24* (2013.01); *B60L 2230/22* (2013.01); *Y02T 90/163* (2013.01); *H02J 2003/003* (2013.01)
    USPC .......................................... 320/128; 320/134

(58) Field of Classification Search
    CPC ............................. H02J 7/0068; H02J 7/0031
    USPC ..................................................... 320/128, 134
    See application file for complete search history.

(56) References Cited

U.S. PATENT DOCUMENTS

2004/0232878 A1*  11/2004  Couch et al. .................. 320/101
2007/0035135 A1*   2/2007  Yoshida ......................... 290/44
2011/0260677 A1*  10/2011  Bando et al. .................. 320/101

FOREIGN PATENT DOCUMENTS

| JP | H6-38384 A    | 2/1994  |
| JP | 2003-158825 A | 5/2003  |
| JP | 2004-291681 A | 10/2004 |
| JP | 2008-43170 A  | 2/2008  |
| JP | 2009-284586 A | 12/2009 |

OTHER PUBLICATIONS

Notice of Reasons for Refusal for Japanese Patent Application No. 2009-080597, issued by the Japanese Patent Office on Jul. 23, 2013.

* cited by examiner

*Primary Examiner* — Drew A Dunn
*Assistant Examiner* — Nathaniel Pelton

(57) ABSTRACT

Included are a power-generation amount calculating section calculating an expected amount of power-generation being an amount of power generated by a power generating section in the future, for each predetermined period, a power-consumption amount calculating section calculating an expected amount of power-consumption being an amount of power consumed by a power load, for the predetermined period, an excess power period determining section determining an excess power period, an excess power amount calculating section calculating an expected excess power amount, and a charge/discharge control section controlling charge/discharge of a battery so that a remaining amount of the battery at the beginning of the excess power period becomes an amount resulting from subtracting the expected excess power amount from a pre-set charge amount.

8 Claims, 4 Drawing Sheets

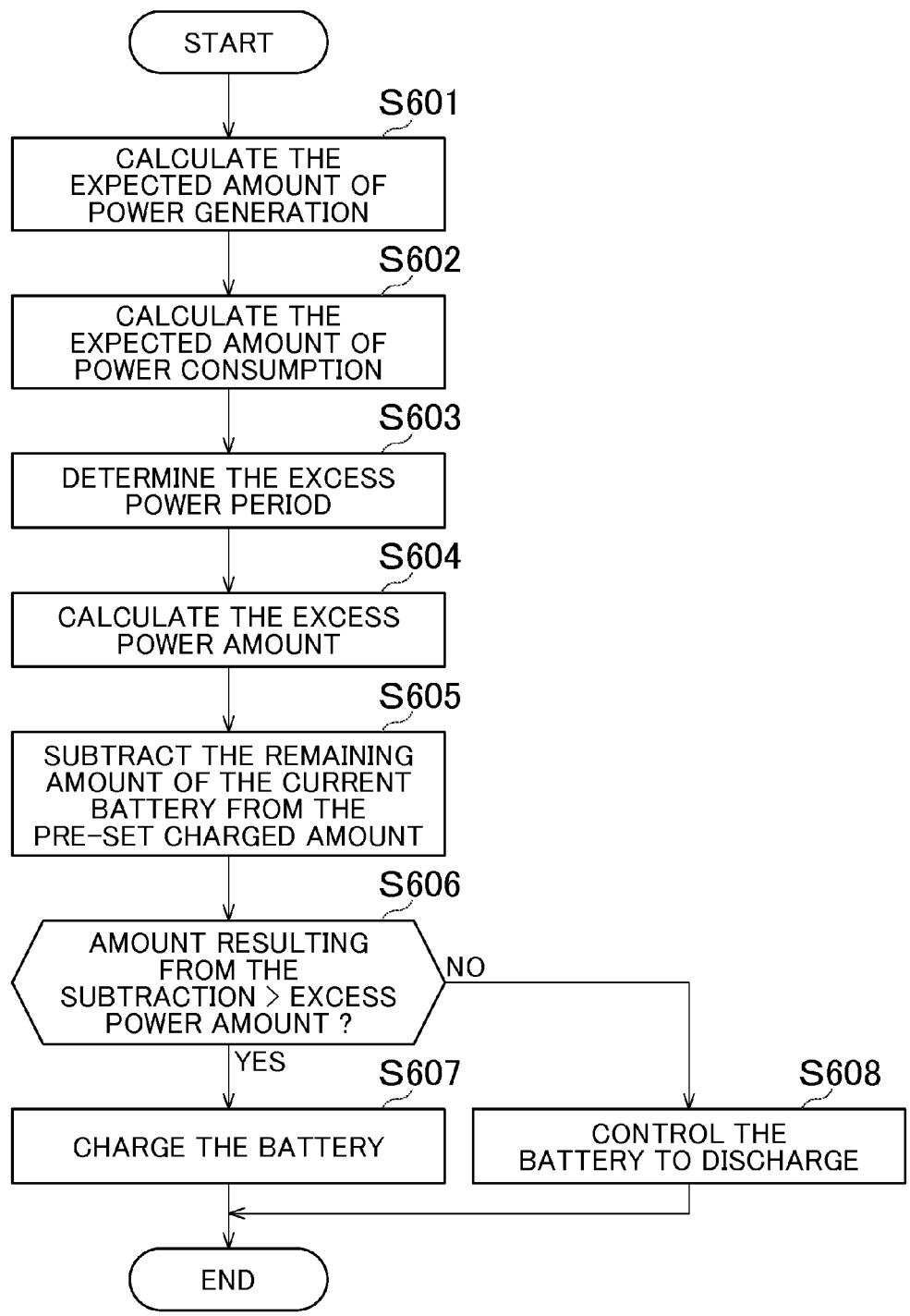
F I G. 4

CHARGE/DISCHARGE CONTROL APPARATUS AND CHARGE/DISCHARGE CONTROL METHOD

The contents of the following International patent application are incorporated herein by reference:

International Patent Application NO. PCT/JP2010/002148 filed on Mar. 25, 2010.

BACKGROUND

1. Technical Field

The present invention relates to a charge/discharge control apparatus and a charge/discharge control method.

2. Related Art

Conventionally, a technique is known by which when the amount of power to be generated by the solar battery on the next day is smaller than the power to be consumed on the next day, the battery is charged with the power corresponding to the shortfall, and when the amount of power to be generated by the solar battery on the next day is greater than the power consumed on the next day, no power charge is made in the battery. In addition, a technique has been known to install a solar battery in a home or the like, to supply the power generated by the solar battery to a load provided in the home or the like, thereby saving power. The power in the power system is supplied to each home via power lines. It is also known in the art to design such that when the amount of power generated by a solar battery is larger than the power consumed by the load, the excess power is outputted to the power system.

Patent Document No. 1: Japanese Patent Application Publication No. H6-38384
Patent Document No. 2: Japanese Patent Application Publication No. 2008-43170
Patent Document No. 3: Japanese Patent Application Publication No. 2003-158825
Patent Document No. 4: Japanese Patent Application Publication No. 2004-291681

SUMMARY

Here, the power line voltage in the power system is controlled to fall in a certain range of voltages, and so when the power line voltage has reached the upper-limit voltage, the power system cannot receive any more excess power. When there is a large amount of sunlight, excess power tends to be generated in each home, and when each home tries to output their excess power to the power line of the power system, the power line will receive an enormous amount of power, to reach the upper limit of the power line voltage, and there will be many homes that cannot output their excess power to the power system. One way to deal with such a case to enable effective use of excess power is to supply the power to the battery mounted on electric cars. However, this is not feasible in many cases because the batteries of electric cars are fully charged during night when the electric fee is cheap. Therefore, in practice, the excess power has not been able to be made use of effectively, and was wasted.

Therefore, according to a first aspect of the innovations herein, provided is a charge/discharge control apparatus including: a power generation amount calculating section that calculates an expected amount of power generation that is an amount of power generated by a power generating section in the future, for each predetermined period; a power consumption amount calculating section that calculates an expected amount of power consumption that is an amount of power consumed by a power load consuming a power generated by the power generating section, for the predetermined period; an excess power period determining section that determines an excess power period that is a period during which the expected amount of power generation is larger than the expected amount of power consumption; an excess power amount calculating section that calculates an expected excess power amount that is an amount of power resulting from subtracting the expected amount of power consumption from the expected amount of power generation in the excess power period; and a charge/discharge control section that controls charge/discharge of a battery so that a remaining amount of the battery at the beginning of the excess power period becomes an amount resulting from subtracting the expected excess power amount from a pre-set charge amount When an amount resulting from subtracting a remaining amount of the battery in the current state from the pre-set charge amount is larger than the expected excess power amount, the charge/discharge control section may charge the battery so that the remaining amount of the battery at the beginning of the excess power period becomes an amount resulting from subtracting the expected excess power amount from the pre-set charge amount.

When an amount resulting from subtracting a remaining amount of the battery in the current state from the pre-set charge amount is smaller than the expected excess power amount, the charge/discharge control section may control the battery to discharge and to supply the discharged power to the power load, so that the remaining amount of the battery at the beginning of the excess power period becomes an amount resulting from subtracting the expected excess power amount from the pre-set charge amount.

The battery may be mounted on a vehicle driven by the battery.

The charge/discharge control apparatus may further include: a usage schedule obtaining section that obtains a usage schedule of the vehicle; and a non-usage period determining section that determines a non-usage period of the vehicle from the usage schedule, where the charge/discharge control section controls charge/discharge of the battery so that the remaining amount of the battery at the beginning of the excess power period included in the non-usage period becomes an amount resulting from subtracting the expected excess power amount from the pre-set charge amount.

The charge/discharge control section may control charge/discharge of the battery so that the remaining amount of the battery at the beginning of the excess power period becomes an amount resulting from subtracting the expected excess power amount from a full charge amount of the battery.

The charge/discharge control apparatus may further include: a charge amount calculating section that calculates a necessary charge amount being a charge amount required for usage of the vehicle, based on the usage schedule, where the charge/discharge control section controls charge/discharge of the battery so that the remaining amount of the battery at the beginning of the excess power period becomes an amount resulting from subtracting the expected excess power amount from the necessary charge amount.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 4 shows an exemplary flow chart of the operation of the charge/discharge control apparatus.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
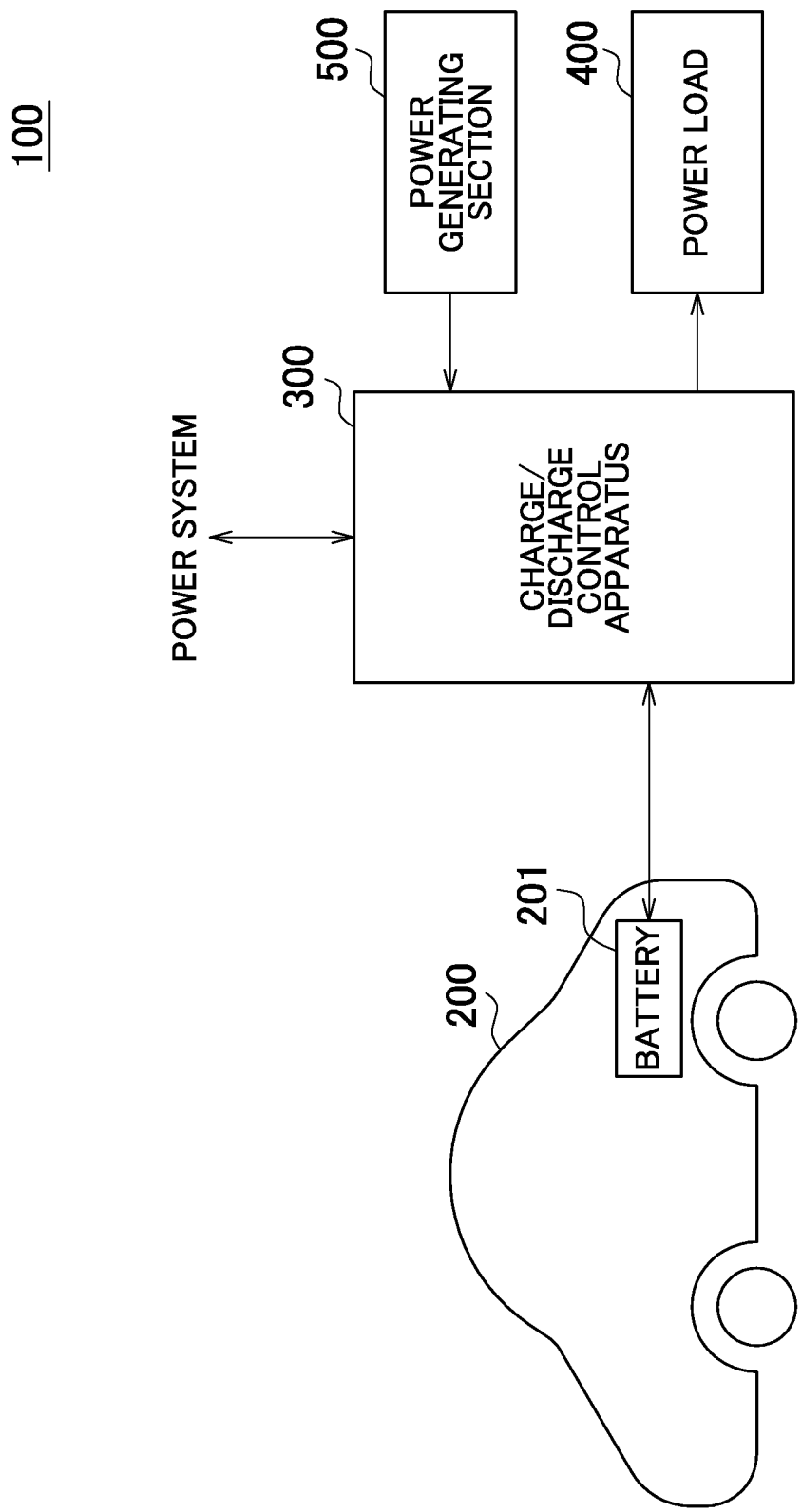
FIG. 1 shows an exemplary power supply system 100.

FIG. 1 shows an exemplary power supply system 100. The power supply system 100 includes a vehicle 200, a charge/discharge control apparatus 300, a power load 400, and a power generating section 500. A battery 201 is mounted on the vehicle 200. The battery 201 accumulates power for driving the vehicle 200. The battery 201 drives the vehicle 200 by supplying power to the motor of the vehicle 200. The vehicle 200 includes a usage schedule registering section for registering the usage schedule of the vehicle 200, having been inputted by a user. The usage schedule may include information such as a usage start time, the place of departure, the destination, or the like of the vehicle 200. The usage schedule registering section may be realized by an information processing apparatus.

The power of the power system is supplied to the charge/discharge control apparatus 300. The power load 400 consumes power. The power load 400 consumes the power generated by the power generating section 500. In addition, the power load 400 may consume at least one of the power from the power system and the power of the battery 201 of the vehicle 200. The power load 400 may be any load in the building, such as an air conditioner, a heater, and a light installed in the building such as a house. The power generating section 500 generates power. The power generating section 500 may be a natural energy power generator for converting natural energy such as sunlight and wind into power. The power generating section 500 may be a solar power generator or a wind power generator.

The charge/discharge control apparatus 300 controls the charge/discharge of the battery 201. The charge/discharge control apparatus 300 charges the battery 201 with the power from the power system. The charge/discharge control apparatus 300 can also charge the battery 201 with the power generated by the power generating section 500. Moreover, the charge/discharge control apparatus 300 supplies the power from the power system to the power load 400. The charge/discharge control apparatus 300 supplies the power generated by the power generating section 500 to the power load 400. In addition, the charge/discharge control apparatus 300 controls the battery 201 to discharge power, to supply the power of the battery 201 to the power load 400. The charge/discharge control apparatus 300 may be installed in a building such as a house.

Figure 2:
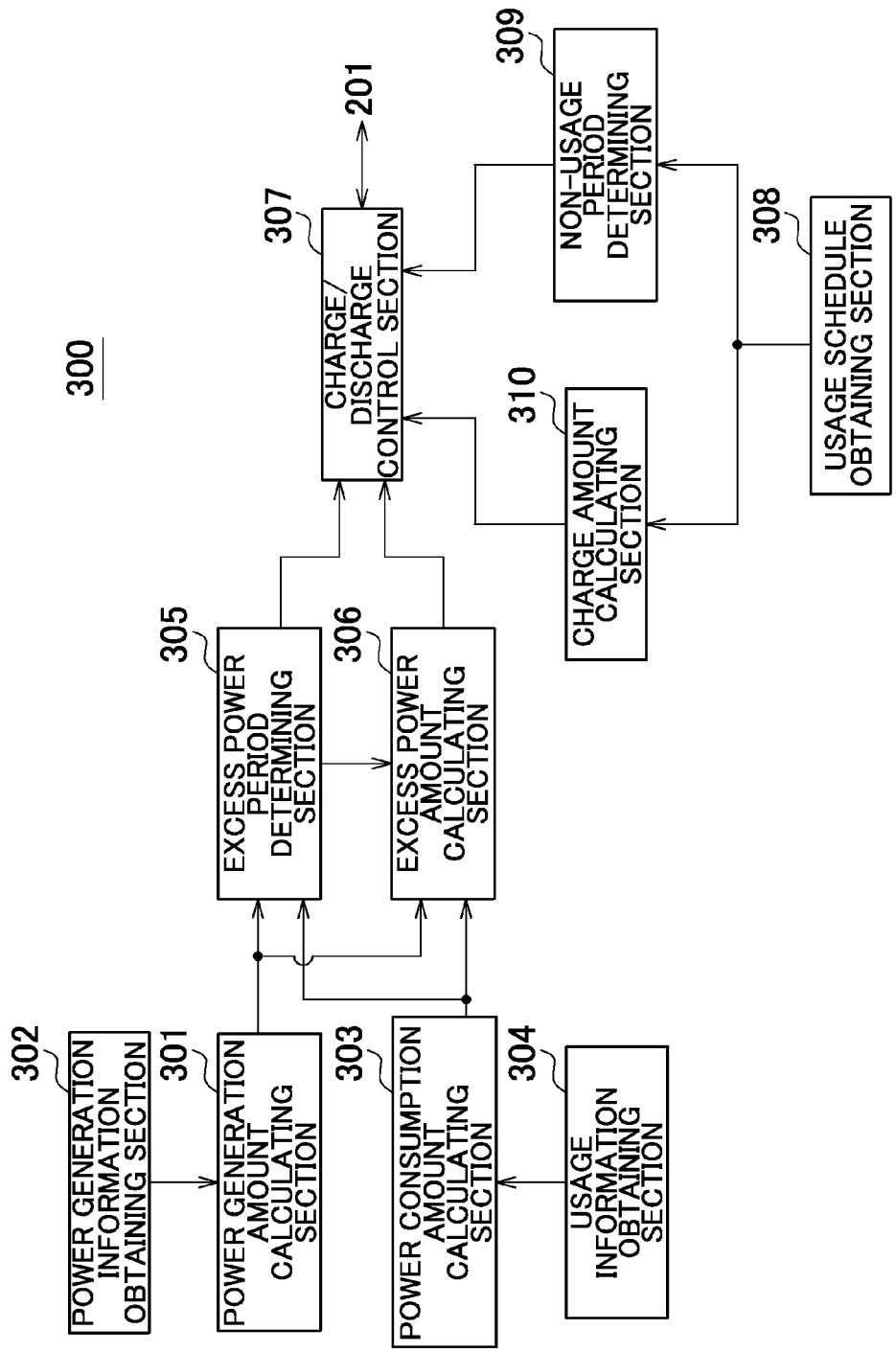
FIG. 2 shows an exemplary charge/discharge control apparatus 300.

FIG. 2 shows an exemplary charge/discharge control apparatus 300. The charge/discharge control apparatus 300 includes a power generation amount calculating section 301, a power generation information obtaining section 302, a power consumption amount calculating section 303, a usage information obtaining section 304, an excess power period determining section 305, an excess power amount calculating section 306, a charge/discharge control section 307, a usage schedule obtaining section 308, a non-usage period determining section 309, and a charge amount calculating section 310. An information processing apparatus such as CPU in which a predetermined program has been read may function as the charge/discharge control apparatus 300. Each section of the charge/discharge control apparatus 300 may be realized by an information processing apparatus.

The power generation amount calculating section 301 calculates the expected amount of power generation, which is the amount of power generated by the power generating section 500 in the future, for each predetermined period. For example, the power generation amount calculating section 301 may calculate the expected amount of power generated by the power generating section 500 on the next day per each hour, for example the expected amount of power generated by the power generating section 500 between 7 o'clock and 8 o'clock, the expected amount of power generation between 8 o'clock and 9 o'clock, and the expected amount of power generation between 9 o'clock and 10 o'clock on the next day. The power generation amount calculating section 301 may calculate the expected amount of power generation in the future, using at least one of the weather forecast, the amount of power generation in the past, the amount of power generation in each weather in the past, the amount of sunlight, and the amount of sunlight in each weather. For example, the power generation amount calculating section 301 may calculate the expected amount of power generation from the future weather, or may use the amount of power generation in the past as the expected amount of power generation. In addition, the power generation amount calculating section 301 may use the amount of generated power in the past, to correct the expected amount of power generation calculated from the future weather. The weather includes information representing the state of the atmosphere taking into consideration various aspects such as atmospheric pressure, temperature, humidity, wind direction, wind velocity, cloud amount, and rainfall amount.

The power generation information obtaining section 302 obtains power generation information. The power generation information may be information used for predicting the amount of power generated by the power generating section 500. The power generation information obtaining section 302 may obtain the amount of power generated by the power generating section 500 for each predetermined period in the past, as the power generation information. The power generation information obtaining section 302 may obtain the amount of generated power for each predetermined period of a day in the past, which is the same day, week, month, or season as the day, the week, the month, or the season of the next day. For example, when the next day falls in July, the amount of generated power for each predetermined period of one day of July in the past may be obtained. The power generation information obtaining section 302 may obtain the amount of generated power for each predetermined period of a day in the past, which is the same weather, and week, month, or season as the weather, and the week, month, or the season of the next day. For example, when the next day falls in July and the weather of the next day is sunny, the amount of generated power for each predetermined period of a day in July in the past when it was sunny may be obtained.

The power generation information obtaining section 302 may obtain, as the power generation information, the amount of sunlight for each predetermined period of a day in the past, which is the same day, week, month, or season as the day, the week, the month, or the season of the next day. For example, when the next day falls in July, the amount of sunlight for each predetermined period of one day of July may be obtained. The power generation information obtaining section 302 may obtain the amount of sunlight for each predetermined period of a day in the past, which is the same weather, and week, month, or season as the weather, and the week, month, or the season of the next day. For example, when the next day falls in July and the weather of the next day is cloudy, the amount of sunlight for each predetermined period of a day in July when it was cloudy may be obtained. The power generation information obtaining section 302 may obtain the future weather by obtaining the weather forecast through the Internet or the like. Or, the power generation information obtaining section 302 may obtain the amount of generated power, from the database recording therein the amount of generated power for each day, week, month, or season. In addition, the power generation information obtaining section 302 may obtain the amount of generated power in the past, from the database recording therein the amount of generated power in each weather for each week, month, or season. In addition, the power generation information obtaining section 302 may obtain the amount of sunlight from the database recording therein the amount of sunlight in each day, week, month, or season. In addition, the power generation information obtaining section 302 may obtain the amount of sunlight from the database recording therein the amount of sunlight in each weather for each week, month, or season.

The power generation amount calculating section 301 may calculate the expected amount of power generation for each predetermined period of the next day, by obtaining the power generation information from the power generation information obtaining section 302. For example, the amount of generated power for each predetermined period of a day in the past being the same in weather and month as the next day having been obtained may be set as the expected amount of power generation having been obtained. In addition, the expected amount of power generation for each predetermined period of a day may be calculated from the weather and the amount of sunlight of the next day having been obtained. In addition, the expected amount of power generation calculated by the weather and the amount of sunlight of the next day may be corrected using the amount of generated power of a day in the past being the same in weather and month as the next day. The power generation amount calculating section 301 calculates the expected amount of power generation for each predetermined period. The power generation amount calculating section 301 outputs the calculated expected amount of power generation for each predetermined period, to the excess power period determining section 305 and the excess power amount calculating section 306.

The power consumption amount calculating section 303 calculates the expected amount of power consumption that is the amount of power to be consumed by the power load 400 in the future for each predetermined period. For example, the power consumption amount calculating section 303 may calculate the power consumption by the power load on the next day per each hour, for example the expected amount of power consumption by the power load 400 between 7 o'clock and 8 o'clock, the expected amount of power consumption between 8 o'clock and 9 o'clock, and the expected amount of power consumption between 9 o'clock and 10 o'clock on the next day. The power consumption amount calculating section 303 may calculate the expected amount of power consumption in the future, using at least one of the weather forecast, the amount of power consumption in the past, and the amount of power consumption in each weather in the past. For example, the power consumption amount calculating section 303 may calculate the expected amount of power consumption from the future weather, or may use the amount of power consumption in the past as the expected amount of power consumption. In addition, the power consumption amount calculating section 303 may use the amount of power consumption in the past, to correct the expected amount of power consumption calculated from the future weather.

The usage information obtaining section 304 obtains the usage information of the power load 400. The usage information obtaining section 304 may obtain the amount of power consumption for each predetermined period of a day consumed by the power load 400 in the past. The usage information obtaining section 304 may obtain the amount of power consumption for each predetermined period of a day in the past, which is the same day, week, month, or season as the day, the week, the month, or the season of the next day. For example, when the next day falls in July, the amount of power consumption for each predetermined period of one day of July in the past may be obtained. The usage information obtaining section 304 may obtain the amount of power consumption for each predetermined period of a day in the past, which is the same weather, and week, month, or season as the weather, and the week, month, or the season of the next day. For example, when the next day falls in July and the weather of the next day is sunny, the amount of power consumption for each predetermined period of a day in July in the past when it was sunny may be obtained.

The usage information obtaining section 304 may obtain, as the usage information, the usage amount of the power load for each predetermined period of a day, which is the same day, week, month, or season as the day, the week, the month, or the season of the next day. For example, when the next day falls in July, the usage amount of the power load for each predetermined period of one day of July may be obtained. The usage information obtaining section 304 may obtain the usage amount of the power load for each predetermined period of a day, which is the same weather, and week, month, or season as the weather, and the week, month, or the season of the next day. For example, when the next day falls in July and the weather of the next day is rainy, the usage amount of the power load for each predetermined period of a day in July when it was rainy may be obtained. The usage information obtaining section 304 may obtain the future weather by obtaining the weather forecast through the Internet or the like. Or, the usage information obtaining section 304 may obtain the amount of power consumption in the past, from the database recording therein the amount of power consumption for each day, week, month, or season. In addition, the usage information obtaining section 304 may obtain the amount of power consumption in the past, from the database recording therein the amount of power consumption in each weather for each week, month, or season. In addition, the usage information obtaining section 304 may obtain the usage amount of the power load in the past, from the database recording therein the usage amount of the power load in each day, week, month, or season. In addition, the usage information obtaining section 304 may obtain the usage amount of the power load in the past, from the database recording therein the usage amount of the power load in each weather for each week, month, or season.

The power consumption amount calculating section 303 may calculate the expected amount of power consumption for each predetermined period of the next day, by obtaining the usage information from the usage information obtaining section 304. For example, the amount of power consumption for each predetermined period of a day in the past being the same in weather and month as the next day having been obtained may be set as the expected amount of power consumption. In addition, the expected amount of power consumption for each predetermined period may be calculated from the usage amount of the power load for each predetermined period of a day in the past being the same in weather and month as the next day having been obtained. The power consumption amount calculating section 303 outputs the calculated expected amount of power consumption to the excess power period determining section 305 and the excess power amount calculating section 306.

The excess power period determining section 305 determines the excess power period that is a period in which the expected amount of generated power is larger than the expected amount of power consumption, from the expected amount of generated power and the expected amount of power consumption for each predetermined period having been received. The excess power period determining section 305 outputs the determined excess power period to the excess power amount calculating section 306 and the charge/discharge control section 307. The excess power amount calculating section 306 calculates the expected excess power amount by subtracting the expected amount of power consumption from the expected amount of power generation during the excess power period. The excess power amount calculating section 306 outputs the calculated expected excess power amount, to the charge/discharge control section 307.

The usage schedule obtaining section 308 obtains the usage schedule of the vehicle 200. The usage schedule obtaining section 308 obtains the usage schedule from the usage schedule registering section of the vehicle 200. The usage schedule obtaining section 308 outputs the obtained usage schedule to the non-usage period determining section 309 and the charge amount calculating section 310. The non-usage period determining section 309 determines the non-usage period of the vehicle 200 from the usage schedule. The non-usage period of the vehicle 200 is a period in which the vehicle 200 is not used, for example a period in which the vehicle 200 is at home. Here, when the vehicle 200 is in a position other than the building in which the charge/discharge control apparatus 300 is installed, e.g., an office, a parking, or a department store, even if the vehicle 200 is not in use, the period is not included in the no-usage period. The non-usage period is a period during which the charge/discharge control apparatus 300 can charge the battery 201 of the vehicle 200. Here, the chargeable period is for example a period in which the charge/discharge control apparatus 300 can be connected to the vehicle 200 by means of a charge cable. The non-usage period determining section 309 outputs the determined non-usage period of the vehicle 200 to the charge/discharge control section 307.

The charge amount calculating section 310 calculates the necessary charge amount being the charge amount required for the next usage of the vehicle 200, based on the usage schedule of the vehicle 200. Since the usage schedule includes the place of departure and the destination, the travel distance between the place of departure to the destination, the change in altitude between the place of departure and the destination, and the power consumption data in the past may be used to calculate the charge amount required for the next usage of the vehicle 200. The charge amount calculating section 310 outputs the calculated required charge amount, to the charge/discharge control section 307.

The charge/discharge control section 307 controls the charge/discharge of the battery 201, so that the remaining amount of the battery 201 at the beginning of the excess power period becomes the amount resulting from subtracting the expected excess power amount from the pre-set charge amount. When the amount resulting from subtracting the remaining amount of the current battery 201 from the pre-set charge amount is larger than the expected excess power amount, the charge/discharge control section 307 charges the battery 201 so that the remaining amount of the battery 201 at the beginning of the excess power period becomes the amount resulting from subtracting the expected excess power amount from the pre-set charge amount. When the amount resulting from subtracting the remaining amount of the current battery 201 from the pre-set charge amount is smaller than the expected excess power amount, the charge/discharge control section 307 causes the battery 201 to discharge power to supply the discharged power to the power load 400, so that the remaining amount of the battery 201 at the beginning of the excess power period becomes the amount resulting from subtracting the expected excess power amount from the pre-set charge amount.

The charge/discharge control section 307 may also control the charge/discharge of the battery 201, so that the remaining amount of the battery 201 at the beginning of the excess power period included in the non-usage period of the vehicle 200 becomes the amount resulting from subtracting the expected excess power amount from the pre-set charge amount. The pre-set charge amount may be the full charge amount of the battery 201. That is, the charge/discharge control section 307 may control the charge/discharge of the battery 201, so that the remaining amount of the battery 201 at the beginning of the excess power period becomes the amount resulting from subtracting the expected excess power amount from the full charge amount of the battery 201. The pre-set charge amount may also be the necessary charge amount that is the charge amount required for the next usage of the vehicle 200. That is, the charge/discharge control section 307 may control the charge/discharge of the battery 201, so that the remaining amount of the battery 201 at the beginning of the excess power period becomes the amount resulting from subtracting the expected excess power amount from the necessary charge amount.

Figure 3:
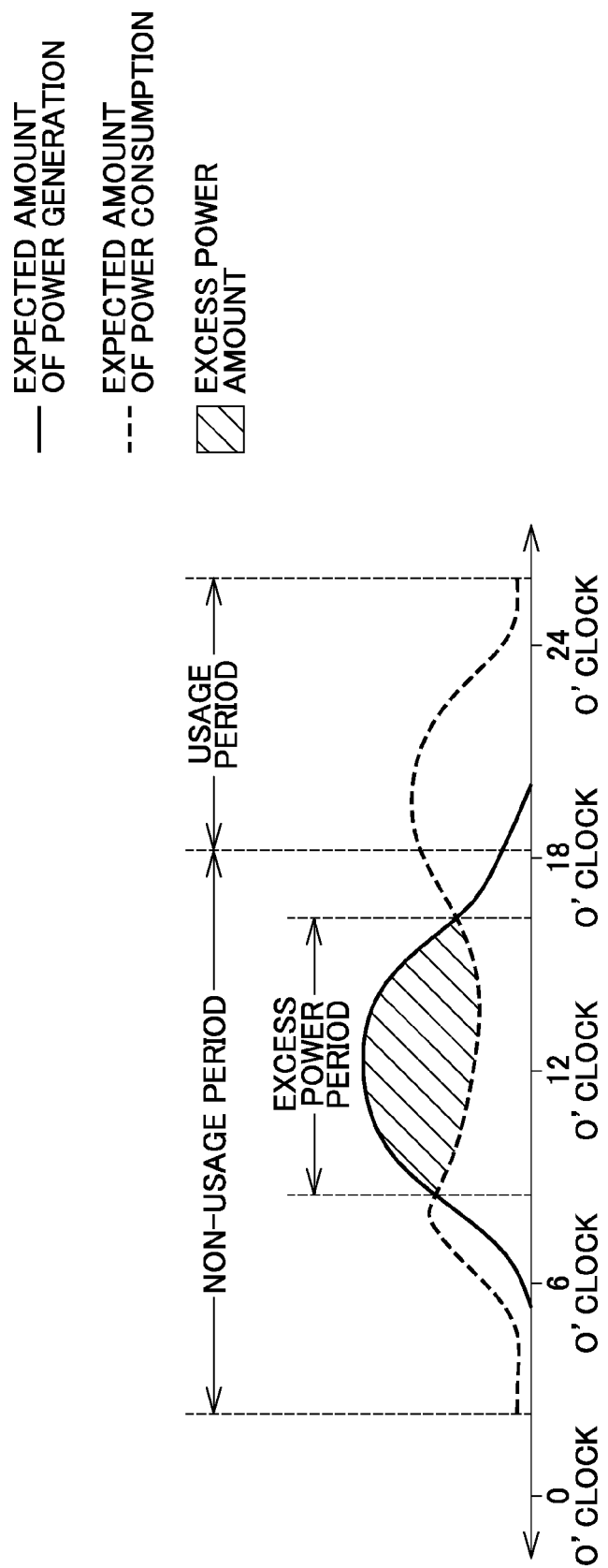
FIG. 3 shows an example of the expected amount of power generation, the expected amount of power consumption, and the expected amount of excess power of the next day.

FIG. 3 shows an example of the expected amount of power generation, the expected amount of power consumption, and the expected amount of excess power of the next day. The expected amount of power generation is shown by a solid line, and the expected amount of power consumption is shown by a broken line. The power generating section 500 gradually generates power from before 6 o'clock in the morning, and the peak of the power generation comes at 12 o'clock. The power generating section 500 ends generating power at 7 o'clock in the evening. FIG. 3 shows the amount of generated power when using the solar power generator. The power consumed by the power load 400 starts increasing at around 5 o'clock in the morning, and the first peak of the power consumption comes around 8:30 in the morning, and the second peak of the power consumption comes around 7 o'clock in the evening. Thereafter, the power consumption gradually decreases. The power generation amount calculating section 301 and the power consumption amount calculating section 303 calculate the expected amount of power generation and the expected amount of power consumption at a predetermined interval (e.g., every 30 minutes).

The period during which the expected amount of power generation is larger than the expected amount of power consumption is the excess power period. During this excess power period, the power load 400 cannot consume all the expected amount of power generation, and an excess power is expected to be caused. The region shown by oblique lines represents the expected excess power amount. In other words, the region shown by oblique lines represents the expected excess power amount resulting from subtracting the expected amount of power consumption from the expected amount of power generation in the excess power period. Although it may be possible to output this expected excess power to the power system, when the amount of generated power is expected to be large, there may be power left in the homes having the power generating section 500.

Therefore, when every home having the power generating section 500 tries to output its excess power to the power line of the power system, the amount of power outputted to the power line will be enormous to cause the voltage at the power line to reach the upper limit value, which may cause many homes that cannot output power to the power system. If the battery 201 of the vehicle 200 can be charged with this expected excess power, the generated power will be used effectively without becoming a waste. So as to maintain the capacity of the battery 201 to enable charging of the expected excess power amount, the charge/discharge of the battery 201 is controlled.

When the amount resulting from subtracting the remaining amount of the current battery 201 from the pre-set charge amount is larger than the expected excess power amount, the battery 201 is charged so that the remaining amount of the battery 201 at the beginning of the excess power period becomes the amount resulting from subtracting the expected excess power amount from the pre-set charge amount. This enables charging the battery 201 with the expected excess power without charging the battery 201 excessively. In addition, since the pre-set charge amount results from charging the battery 201 with the expected excess power, it does not interfere with the next usage of the vehicle 200. When the amount resulting from subtracting the remaining amount of the current battery 201 from the pre-set charge amount is smaller than the expected excess power amount, the battery 201 is caused to discharge power to supply the discharged power to the power load 400, so that the remaining amount of the battery 201 at the beginning of the excess power period becomes the amount resulting from subtracting the expected excess power amount from the pre-set charge amount. This enables to reduce the power supplied to the power load 400 from the electric power company and to charge the battery 201 with the expected excess power. In addition, since the pre-set charge amount results from charging the battery 201 with the expected excess power, it does not interfere with the next usage of the vehicle 200.

Before the excess power period, the expected amount of power consumption by the power load 400 is larger than the expected amount of power generation by the power generating section 500, and so it is required to supply the power from the power system to the power load 400. However, when the amount resulting from subtracting the remaining amount of the current battery from the pre-set charge amount is larger than the expected excess power amount, the amount of power supplied to the power load 400 from the power system can be restrained by controlling the battery 201 to discharge to supply the discharged power to the power load 400 prior to the excess power period. When the amount resulting from subtracting the remaining amount of the current battery from the pre-set charge amount is smaller than the expected excess power amount, the battery 201 can be charged with the power from the power system at night, to facilitate charging of the battery 201 at reasonable rate.

FIG. 4 shows an exemplary flow chart of the operation of the charge/discharge control apparatus. At Step S601, the generated power calculating section 301 calculates the expected amount of power generation that is the amount of power generated by the power generating section 500 on the next day for each predetermined period. At Step S602, the power consumption amount calculating section 303 calculates the expected amount of power consumption that is the amount of power consumed by the power load 400 on the next day for each predetermined period. At Step S603, the excess power period determining section 305 determines the excess power period during which the expected amount of power generation is larger than the expected amount of power consumption, from the expected amount of power generation calculated for each predetermined period and the expected amount of power consumption calculated for each predetermined period. At Step S604, the excess power amount calculating section 306 calculates the excess power amount by subtracting the expected amount of power consumption from the expected amount of power generation in the excess power period for each predetermined period.

At Step S605, the charge/discharge control section 307 subtracts the remaining amount of the current batter 201 from the pre-set charge amount. The pre-set charge amount may be the full charge amount of the battery 201, or may be a necessary charge amount that is necessary for the next usage of the vehicle 200. The pre-set charge amount may be the charge amount designated by a user. At Step S606, the charge/discharge control section 307 determines whether the amount resulting from the subtraction is larger than the excess power amount. Note that when the excess power period does not fall within the non-usage period, the charge/discharge control section 307 cannot charge the battery 201 with the excess power, and so can simply end the processing. On the contrary, when the excess power period partially overlaps with the non-usage period and is not completely included in the non-usage period, the battery 201 can be only charged with the excess power in the overlapping excess power period. In view of this, the charge/discharge control section 307 can determine whether the amount resulting from the subtraction is larger than the expected excess power amount in the overlapping excess power period.

At Step S606, when the amount resulting from the subtraction is larger than the expected excess power amount, at Step S607, the charge/discharge control section 307 charges the battery 201 so that the remaining amount of the battery 201 at the beginning of the excess power period becomes the amount resulting from subtracting the expected excess power amount from the pre-set charge amount. According to this configuration the battery 201 can be charged with the excess power. In addition, at the next usage of the vehicle 200, the battery 201 can be charged to the level of the predetermined charge amount. On the other hand, at Step S606, when the amount resulting from the subtraction is not larger than (i.e., smaller than) the expected excess power amount, at Step S608, the charge/discharge control section 307 controls the battery 201 to discharge power and to supply the discharged power to the power load 400, so as to obtain the amount corresponding to the amount resulting from subtracting the expected excess power amount from the pre-set charge amount.

In this way, the excess power can be effectively made use of, without causing the excess power a waste. In addition, because the excess power can be effectively made use of, the amount of power supplied from the power electric company can be restrained and the reasonable electricity expense can be realized. Note that although the power generation amount calculating section 301 is explained to calculate the expected amount of power generation of the next day, as the amount of power generation in the future, it may calculate the expected amount of power generation during a certain period in the future. In addition, the power consumption amount calculating section 303 is explained to calculate the expected amount of power consumption of the next day, as the amount of power consumption by the power load 400 in the future, it may calculate the expected amount of power consumption during a certain period in the future. In addition, the certain period during which the expected amount of power generation is calculated by the power generation amount calculating section 301 and the certain period during which the expected amount of power consumption is calculated by the power consumption amount calculating section 303 can be the same period.

In addition, when the amount of power consumption prior to the excess power period is still large even after controlling the battery 201 to discharge the battery 201 prior to the excess power period so as to achieve the amount resulting from subtracting the expected excess power amount from the pre-set charge amount, determining that the amount resulting from subtracting the remaining amount of the current battery 201 from the predetermined charge amount is smaller than the excess power amount, the power amount from the battery 201 is not sufficient and there will still be a shortfall in the power amount. In this case, the power from the power system becomes necessary. Therefore, so as to enable the battery 201 to supply the power consumed by the power load 400 prior to the excess power period, the battery 201 may be charged with the amount of power corresponding to the expected shortfall in advance during night. Accordingly, the remaining amount of the battery 201 at the beginning of the excess power period can be set to the amount resulting from subtracting the expected excess power amount from the pre-set charge amount, as well as using power of the battery 201 to compensate for the power consumed by the power load 400 prior to the excess power period.

When the amount resulting form subtracting the remaining amount of the current battery 201 from the pre-set charge amount is larger than the excess power amount, the battery 201 can be charged in advance during night, so that the charge amount will be the value resulting from adding 1) the charge amount resulting from subtracting the expected excess power amount from the pre-set charge amount to 2) the charge amount corresponding to the amount of power expected to be consumed prior to the excess power period. Accordingly, the remaining amount of the battery 201 at the beginning of the excess power period can be set to the amount resulting from subtracting the expected excess power amount from the pre-set charge amount, as well as using the power of the battery 201 to compensate for the power consumed by the power load 400 prior to the excess power period.

When the amount of actually generated power is smaller than the expected amount of power generation, the excess power amount expected to be obtained is not actually obtained, and so the battery 201 cannot be fully charged. Therefore, the power generation amount calculating section 301 may correct the expected amount of power generation depending on the day of the month, the day of the week, or the like during which the expected amount of power generation is calculated. The power generation amount calculating section 301 may correct the calculated expected amount of power generation by multiplying it with a correction coefficient. When the expected amount of power generation has been corrected, the amount of power generation after correction will be the expected amount of power generation. The correction coefficient is preferably a positive number no greater than 1. By setting the expected amount of power generation to be smaller, it can cope with such a situation in which the amount of actually generated power is smaller than the expected amount of power generation.

When the amount of actually consumed power is larger than the expected amount of power consumption, the excess power amount expected to be obtained is not actually obtained, and so the battery 201 cannot be fully charged. Therefore, the power consumption amount calculating section 303 may correct the expected amount of power consumption depending on the day of the month, the day of the week, or the like during which the expected amount of power consumption is calculated. The power consumption amount calculating section 303 may correct the calculated expected amount of power consumption by multiplying it with a correction coefficient. When the expected amount of power consumption has been corrected, the amount of power after correction will be the expected amount of power consumption. The correction coefficient is preferably the value no smaller than 1. By setting the expected amount of power consumption to be larger, it can cope with such a situation in which the amount of actually consumed power is larger than the expected amount of power consumption. The power consumption amount calculating section 303 may set the correction coefficient to be larger for the day when there is an event. Some examples of the event may be the final game of the Koshien or an Olympic game, when it is expected to experience a larger amount of power consumption than in normal days. Conversely, the correction coefficient can be set to be a positive number no greater than 1, for the day when it is expected to experience a smaller amount of power consumption than usual. Accordingly, the power of the battery 201 can be effectively made use of.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A charge/discharge control apparatus comprising:
 a power generation amount calculating section that calculates an expected amount of power generation that is an amount of power generated by a power generating section in the future, for each predetermined period;
 a power consumption amount calculating section that calculates an expected amount of power consumption that is an amount of power consumed by a power load consuming a power generated by the power generating section, for the predetermined period;
 an excess power period determining section that determines an excess power period that is a period during which the expected amount of power generation is larger than the expected amount of power consumption;
 an excess power amount calculating section that calculates an expected excess power amount that is an amount of power resulting from subtracting the expected amount of power consumption from the expected amount of power generation in the excess power period; and a charge/discharge control section that controls charge/discharge of a battery so that a remaining amount of the battery at the beginning of the excess power period becomes an amount resulting from subtracting the expected excess power amount from a pre-set charge amount.

2. The charge/discharge control apparatus according to claim 1, wherein when an amount resulting from subtracting a remaining amount of the battery in the current state from the pre-set charge amount is larger than the expected excess power amount, the charge/discharge control section charges the battery so that the remaining amount of the battery at the beginning of the excess power period becomes an amount resulting from subtracting the expected excess power amount from the pre-set charge amount.

3. The charge/discharge control apparatus according to claim 1, wherein when an amount resulting from subtracting a remaining amount of the battery in the current state from the pre-set charge amount is smaller than the expected excess power amount, the charge/discharge control section controls the battery to discharge and to supply the discharged power to the power load, so that the remaining amount of the battery at the beginning of the excess power period becomes an amount resulting from subtracting the expected excess power amount from the pre-set charge amount.

4. The charge/discharge control apparatus according to claim 1, wherein the battery is mounted on a vehicle driven by the battery.

5. The charge/discharge control apparatus according to claim 4, further comprising:

a usage schedule obtaining section that obtains a usage schedule of the vehicle; and a non-usage period determining section that determines a non-usage period of the vehicle from the usage schedule, wherein the charge/discharge control section controls charge/discharge of the battery so that the remaining amount of the battery at the beginning of the excess power period included in the non-usage period becomes an amount resulting from subtracting the expected excess power amount from the pre-set charge amount.

6. The charge/discharge control apparatus according to claim 1, wherein the charge/discharge control section controls charge/discharge of the battery so that the remaining amount of the battery at the beginning of the excess power period becomes an amount resulting from subtracting the expected excess power amount from a full charge amount of the battery.

7. The charge/discharge control apparatus according to claim 5, further comprising:

a charge amount calculating section that calculates a necessary charge amount being a charge amount required for usage of the vehicle, based on the usage schedule, wherein the charge/discharge control section controls charge/discharge of the battery so that the remaining amount of the battery at the beginning of the excess power period becomes an amount resulting from subtracting the expected excess power amount from the necessary charge amount.

8. A charge/discharge control method comprising:

calculating an expected amount of power generation that is an amount of power generated by a power generating section in the future, for each predetermined period;

calculating an expected amount of power consumption that is an amount of power consumed by a power load consuming a power generated by the power generating section, for the predetermined period;

determining an excess power period that is a period during which the expected amount of power generation is larger than the expected amount of power consumption;

calculating an expected excess power amount that is an amount of power resulting from subtracting the expected amount of power consumption from the expected amount of power generation in the excess power period; and controlling charge/discharge of a battery so that a remaining amount of the battery at the beginning of the excess power period becomes an amount resulting from subtracting the expected excess power amount from a pre-set charge amount.

* * * * *